United States Patent [19]

Awl et al.

[11] B 3,983,067

[45] Sept. 28, 1976

[54] DIACETAL DERIVATIVES OF POLYUNSATURATED FATTY ESTERS AS PRIMARY PLASTICIZERS FOR POLYVINYLCHLORIDE

[75] Inventors: Richard A. Awl, East Peoria; Everett H. Pryde, Peoria, both of Ill.

[73] Assignee: The United Sates of America as represented by the Secretary of Agriculture, Washington, D.C.

[22] Filed: July 1, 1974

[21] Appl. No.: 485,060

[44] Published under the second Trial Voluntary Protest Program on February 17, 1976 as document No. B 485,060.

[52] U.S. Cl. ........................... 260/30.4 R; 260/32.2; 260/340.9; 260/410.9 R
[51] Int. Cl.² .......................................... C08K 5/10
[58] Field of Search .................. 260/410.9 R, 340.9, 260/32.2, 30.4 R

[56] References Cited
UNITED STATES PATENTS
3,787,459   1/1974   Frankel ........................ 260/410.9 R OTHER PUBLICATIONS
R. A. Awl, "Acetal Derivatives of Methyl 9(10) Formylstearate: Plasticizers for PVC", J. Amer. Oil Soc. 49(4), pp. 222–228, 1972.

*Primary Examiner*—Paul R. Michl
*Attorney, Agent, or Firm*—M. Howard Silverstein; David G. McConnell

[57] ABSTRACT

Acetal derivatives of polyunsaturated fatty compositions were prepared and found to function as primary plasticizers. Poly(vinyl chloride) resins plasticized by the compositions of the invention have properties equal or superior to resins plasticized by dioctyl phthalate or dioctyl sebacate.

10 Claims, No Drawings

DIACETAL DERIVATIVES OF POLYUNSATURATED FATTY ESTERS AS PRIMARY PLASTICIZERS FOR POLYVINYLCHLORIDE

BACKGROUND OF THE INVENTION

This invention relates to the preparation of acetal derivatives of polyunsaturated fatty esters. The invention further relates to the compositions thus prepared and to their use as primary plasticizers for poly(vinyl chloride).

A plasticizer is a material which is incorporated in a plastic and which functions to increase its workability and flexibility. The search for acceptable plasticizers has been a very active one. In 1934 about 56 plasticizers were being produced and from that time until about 1934, over 20,000 plasticizer compositions had been disclosed in the literature, 60 of which are among the 500 presently available (cf. Encyclopedia of Polymer Science and Technology, Vol. 10, John Wiley and Sons, Inc., 1969, p. 230).

The types of organic plasticizers in general use are liquids having moderately high molecular weights and include esters of carboxy acids, esters of phorphoric acids, hydrocarbons, halogenated hydrocarbons, ethers, polyglycols, and sulfonilamides.

Dioctyl phthalate (DOP) is the most widely used primary plasticizers for poly(vinyl chloride), PVC, and accounts for about 25 percent of the total market (Encyclopedia of Polymer Science and Technology, supra, p. 231). For reasons of compatibility, costs, process behavior, and performance, primary PVC plasticizers are limited to various dibasic acids and phosphate esters, epoxidized oils and resins, glycolates, mellitates, and polyesters of various dibasic acids with glycols, pentaerythritol derivatives, and sulfonates. Secondary PVC plasticizers are generally limited to various aromatic and mixed aromatic aliphatic oils, chlorinated paraffins, polyalpha methyl styrene derivatives and esters of high molecular weight alcohols, and organic acid (cf. Modern Plastics Encyclopedia, Vol. 50, No. 1A, 1973–74, pp. 254–266).

The object of this invention is the provision of compositions which are useful as primary plasticizers for PVC, which are easily prepared from inexpensive starting materials such as vegetable oils, and which impart to the PVC physical properties equal or superior to those of PVC compositions plasticized with commercially available plasticizers such as DOP.

In accordance with the above object, we have found a method of preparing primary plasticizers for PVC comprising the following steps:

a. reacting methyl diformylstearate, or methyl triformylstearate, or mixtures of the same with trimethyl orthoformate and methanol, or with ethylene glycol to form the corresponding dimethyl acetal or ethylene acetal derivatives of the methyl diformylstearate, or of the methyl triformylstearate, or of the mixtures; and b. recovering the resulting poly(dimethyl acetal) or poly(ethylene acetal) fatty methyl esters from the reaction mixture of step (a).

The compositions thus prepared are then fused in plasticizer amounts with PVC.

DETAILED DESCRIPTION OF THE INVENTION

Primary plasticizers are plasticizers which are miscible with the polymer in amounts sufficient to impart the desired characteristics to the final product without exuding. Secondary plasticizers are those which are not soluble in the polymer in the desired amounts and, therefore, must be used in smaller amounts in combination with another more compatible plasticizer. Compatibility is the term used to describe the ability of two or more substances to mix with each other to form a homogenous mixture. "Compatibility" will be used herein to describe the miscibility of plasticizer and polymer. The desired plastic product is formed by vigorously mixing polymer and plasticizer at elevated temperature [about 160° C. for poly(vinyl chloride)] until "fusion" takes place. Fusion is the mechanism by which plasticizer and polymer become a homogenous mixture and, therefore, the ease of fusion is directly related to compatibility.

It is generally believed that in PVC, ease of fusion tends to decrease with increasing molecular size and decreasing polarity, and that addition of $-CH_2-$ groups or ether linkages to the plasticizer molecule also decreases its compatibility for PVC (Encyclopedia of Polymer Science and Technology, supra, p. 250).

Pryde et al. (Polym. Eng. Sci. 6(1): 1–6, 1966) describe mono-acetal derivatives of azelaaldehydate which functioned as primary plasticizers for PVC. Also disclosed was the fact that comparable mono-acetal derivatives of brassilaldehydate were not compatible with PVC, apparently because of the additional four carbon atoms in the carbon chain.

Awl et al. (J. Amer. Oil Soc. 49(4): 222–228, 1972) discloses a mono-acetal derivative of methyl 9(10)-formylstearate which differs from the azelaaldehydate-mono-acetal derivatives described by Pryde et al., supra, in that the carbon chain of methyl 9(10)-formylstearate is ten carbons longer than that of methyl azelaaldehydate. As expected, mono-acetal derivatives of methyl 9(10)-formylstearate are useful only as secondary plasticizers for PVC (i.e., as a 50:50 mixture with DOP) due to their incompatibility when added alone to the resin.

Therefore, in view of the prior art teaching that mono-acetal derivatives of fatty compositions having 18 carbon atom aliphatic chains are incompatible with PVC, and that the addition of ether linkages to plasticizer compositions decreases compatibility, we were surprised to discover that di- and triacetal derivatives of di- and triformylstearate were compatible with PVC and were equal to and in some instances superior to DOP and DOS when used as primary plasticizers.

Methyl di- and triformylstearate from any source are useful starting materials for the preparation of the instant plasticizers. They are preferably prepared by the method of E. N. Frankel (U.S Pat. No. 3,787,459; and in Ann. N.Y. Acad. Sci. 214: 79–93, June 15. 1973) in which di- and triunsaturated fatty methyl esters, carbon monoxide, and hydrogen react in the presence of a supported rhodium metal-trisubstituted phosphine admixture to form the corresponding di- and triformyl products.

For example, a diunsaturated 18 carbon fatty methyl ester such as methyl linoleate, when treated according to Frankel's method, will form diformylstearate with about 66 percent of the formyl groups being attached to one of the carbon atoms which were originally unsaturated (i.e., on carbons 9, 10, 12, or 13 of the linoleate). The remaining 34 percent of the hydroformylation products are positional isomers wherein the formyl groups are found on carbons 8 through 14. Triunsaturated fatty methyl esters hydroformylated in the same manner result in similar isomeric mixtures. The presence in the plasticizer compositions of the invention of acetal derivatives formed from these position isomers apparently did not affect the usefulness of the plasticizers and, therefore, the usefulness of di- and triformyl starting materials wherein the formyl groups are found on essentially any carbon in the carbon chain. More specifically "methyl diformylstearate" is defined herein as:

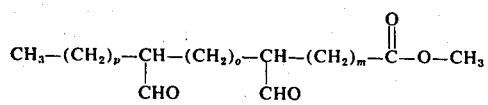

where $m + o + p = 14$ and $o = 1$ or $2$; and "methyl triformylstearate" is defined herein as:

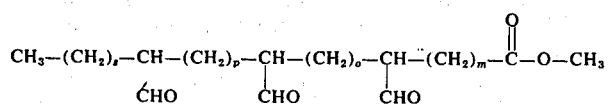

where $m + o + p + s = 13$, $o = 1$ or $2$, and $p = 1$ or $2$.

Other alkyl ester groups such as ethyl- and butyl- are considered equivalent to the methyl group, and other di- and triformyl fatty esters having carbon chains containing from 14 to 20 carbons are considered equivalent to the di- and triformylstearates disclosed above. However, as more —CH$_2$— groups are added to the plasticizer molecule, the plasticizer tends to become less compatible with PVC.

Di- and triformylated fatty esters starting materials were "acetalated" (i.e., acetalate = to introduce an acetal group into an organic molecule) individually, in mixtures with each other, or in mixtures with other fatty compositions, both natural and synthetic. Th hydroformylated products of soybean oil, safflower oil, olive oil, or linseed oil methyl esters are suitable for use as starting materials for the preparation of acetal derivatives However, to be suitable for use as plasticizers, the di- an triacetal derivatives preferably are separated from other compositions in the reaction mixtures which result from the acetalation of hydroformylated vegetable oils or the like.

In the preferred procedure, mixtures of fatty methyl esters containing methyl linoleate, methyl linolenate, or both, such as would be found in the vegetable oil methyl esters described above, were hydroformylated according to the method of E. N. Frankel, supra, resulting in hydroformylated fatty methyl ester mixtures containing monoformyl esters, unformylated saturated esters, unsaturated formyl esters, and the desired polyformyl fatty methyl esters (cf. U.S. Pat. No. 3,787,459, supra, for analysis of hydroformylated safflower oil methyl esters, olive oil methyl esters, and of methyl linolenate). Polyformyl fatty methyl esters are defined herein to include only methyl di- and triformylstearates.

The above hydroformylated fatty methyl ester mixtures were reacted with methanol and trimethyl orthoformate, or with ethylene glycol in benzene in the presence of an acid catalyst such as potassium bisulfate, hydrochloric acid, sulfuric acid, and paratoluene sulfonic acid to form acetals corresponding to each formyl composition in the mixture. The hours. However, Reflux temperatures of the reaction mixtures were sufficient to obtain the desired products and were dependent on the solvent used. Th formation of dimethyl acetal derivatives of hydroformylated linseed methyl esters was achieved in 2 hours, while the formation of the ethylene acetal derivatives required 12 hours.- However, neither temperature nor time of reaction is critical and will vary according to starting materials and solvent used in the reaction. Those skilled in the art will be able to determine optimum conditions with a minimum of experimentation.

When the acetalated mixture contains substances other than the desired poly(dimethyl acetal) or poly(ethylene acetal) fatty methyl esters, these desired compositions were recovered from the reaction mixture in a manner such that the recovered composition contained no more than 10 percent by weight mono(-dimethyl acetal) or mono(ethylene acetal) fatty methyl esters. The preferable method of recovery was fractionation by molecular distillation. Poly(dimethyl acetal) fatty methyl esters are herein defined to include only methyl di- and tri(dimethyl acetal) stearates which are more specifically defined by the following structures:

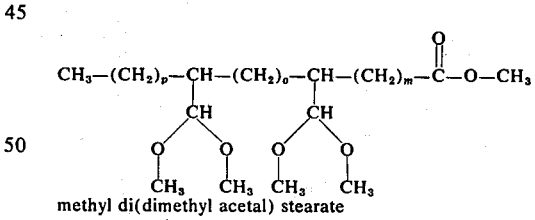
methyl di(dimethyl acetal) stearate where $m + o + p = 14$ and $o = 1$ or $2$; and

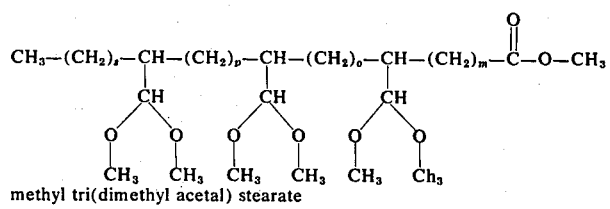
methyl tri(dimethyl acetal) stearate where $m + o + p + s = 13$, $o = 1$ or $2$, and $p = 1$ or $2$.

Poly(ethylene acetal) fatty methyl esters are herein defined to include only methyl di- and tri(ethylene acetal) stearates which are more specifically defined by the following structures:

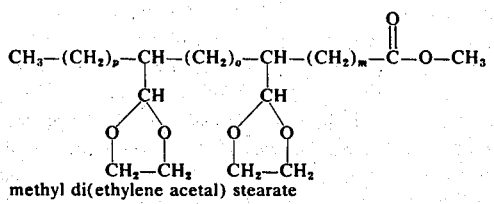
methyl di(ethylene acetal) stearate where $m + o + p = 14$ and $o = 1$ or 2; and

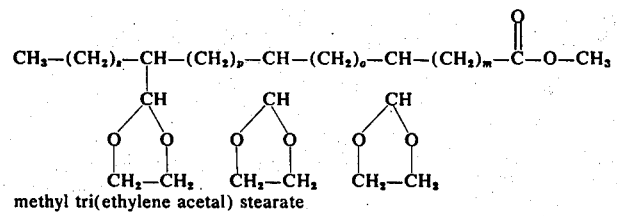
methyl tri(ethylene acetal) stearate where $m + o + p + s = 13$, $o = 1$ or 2, and $p = 1$ or 2.

Any of the commercially available PVC products, which normally have a molecular weight of from 50,000 to 120,000, are suitably compatible with the plasticizer compositions of the invention, and with the various additives which are often included in the plastic formulation. These additives include heat stabilizers such as mixtures of metallic salts based on Pd, Ba, and Cd, and epoxidized oils; fillers and extenders which are usually relatively inexpensive high boiling compositions used to plasticize and extend the volume of the plastic; lubricants; and pigments. Those skilled in the art will know which and how much of the many available additives will be useful in combination with the instant plasticizers to give PVC products having the desired properties.

The instant plasticizers are incorporated in the mixture in amounts from about 5 to 35 percent by weight and preferably in amounts from about 30 to 32 percent by weight. At lower concentrations the plasticized product is more rigid, having a higher tensile strength but lower flexibility. At concentrations of below 5 percent the plasticizer compositions act as processing aids without significantly affecting the properties of the product.

The plasticizers of the invention are not volatilized at fusion temperatures (i.e., about 160° C. for PVC) and therefore remain in the final product.

Fusion of PVC and plasticier is normally accomplished by combining all the desired ingredients and subjecting the mixture to vigorous mixing at the fusion point temperature. This is preferably done by milling the mixture in a rubber mill, such as a Banbury mixer, at about 160° C. for about 8 minutes. The fused composition is then transferred to a suitable heat mold which is maintained at 160° C. for about 10 minutes, then a pressure of about 1000 p.s.i. is applied for about 10 minutes while the 160° C. temperature is maintained. The mold is usually cooled to room temperature under pressure.

The following examples are intended only to further illustrate the invention and are not intended to limit the scope of the invention which is defined by the claims.

EXAMPLE 1

A. Hydroformylation of linseed oil methyl esters.

A 2-liter autoclave was charged with 697 g. of linseed oil methyl esters containing 8.1% methyl palmitate, 4.0% methyl stearate, 21.1% methyl oleate, 16.4% methyl linoleate, and 50.3% methyl linoleate.

Five grams of a 5% rhodium-on-carbon catalyst, 3.5 g. of triphenyl phosphate, and 200 ml. of toluene were added to the autoclave. The autoclave was sealed, purged with approximately 200 p.s.i.g. of a 1:1 mixture of hydrogen and carbon monoxide, then pressurized with the same gas mixture to 2000 p.s.i.g. The vessel was shaken automatically,, and heat was applied. After 26 minutes the temperature reached 110° C. and was maintained at 110° C. ± 4° for 1 hour 45 minutes, during which time the pressure was maintained at 1800–2500 p.s.i.g.

The autoclave was cooled to room temperature and the reaction mixture was filtered and the solvent removed to give 863 g. of a dark brown product (cf. Table 1, Example 1A for GLC analysis).

B. Acetalation of hydroformylated linseed methyl esters.

A three-necked round-bottom flask equipped with a $N_2$ inlet tube, a stopper, and a Friedrich condenser connected to a silicone oil bubbler was purged with dry $N_2$. Then 252.3 g. of hyroformylatd linseed methyl esters of (A) above were added to 300 ml. of $CH_3OH$ in the flask. This mixture was stirred magnetically as a slow flow of $N_2$ was continued and 100 ml. of 7% $HCl—CH_3OH$ and 133 ml. $CH(OCH_3)_3$ (methyl orthoformate) were added and the flask stoppered. The cloudy mixture became homogeneous and a gentle reflux began immediately after addition of $CH(OCH_3)_3$. No external heat was applied. After 2 hours, GLC analyses indicated that the acetalation was complete. The acidic solution was neutralized with 250 ml. of 6% $NaHCO_3$ and the mixture was transferred to a separatory funnel. (Crude acetal was heavier than water.) The aqueous wash was separated and extracted with $CH_2Cl_2$. The crude product diluted in ether was washed three times with water. The aqueous washes were extracted with $CH_2Cl_2$ which was in turn washed and added to the ether solution. This solution was dried with $MgSO_4$ and filtered. Solvent was removed on a rotary evaporator to afford 284.5 g. of clear, yellow liquid (cf. Table 1, Example 1B).

C. Distillation.

The crude product of step (B) (281 g.) was fractionated by two successive molecular distillations to obtain 137 g. of a clear, colorless distillate (cf. Table 1, Example 1C) which distilled at 115°–125° C/36–30 millitorr. Example 1C was distilled from the residue (164.3 g.) of the first distillation because the first distillate (113.2 g.;

distilled at 87°–98°]C./35 millitorr) consisted mostly of palmitate, stearate, and mono-acetal.

Analysis of Products of Steps (A), (B), and (C) Above.

Acid values were determined by titration of weighed samples in a mixture of $CH_3OH-C_6H_6$ (20:40) with standard $NaOCH_3$ in $CH_3OH$ to the phenolphthalein end point. Hydroxyl values were determined according to the procedure of Siggia et al. (Anal. Chem. 37: 600, 1965). GLC of the hydroformylated samples and their corresponding acetals was done as described by Awl et al., supra, except that temperature programming was increased to 180°–260° C. at 4° C./minute and helium flow, to 75 ml./minute.

EXAMPLE 6

Benzene (500 ml.), $KHSO_4$ (5.0 g., fused and pulverized), ethylene glycol (171 ml.), and hydroformylated linseed esters (500 g., prepared as described in Example 1A, see 6A, Table 1) were added to the reaction flask and purged with dry $N_2$. The acetalation apparatus was essentially the same as above except that a Dean-Stark receiver was inserted between the reaction flask and the condenser to collect benzene-water azeotrope. The mixture became homogeneous after heating to reflux temperature. After refluxing 12 hours, 53 g. of water were collected, and GLC indicated complete acetalation. The cooled solution was decanted into a Table 1

| Example No. | Description[a] | Acid Value | Gas Liquid Chromatographic Analysis, % | | | | |
|---|---|---|---|---|---|---|---|
| | | | Fatty Esters[b] | Formyl/Acetal Esters | | | Other Components |
| | | | | Mono | Di | Tri | |
| 2A | M HF Ls[c] | 6.4 | 14.2 | 27.5 | 24.7 | 33.5 | 0.1 |
| 2B | M HF Ls DMA | 2.1 | 11.6 | 22.4 | 16.1 | 45.4 | 4.5 |
| 2C | 1A distilled 5× | 2.9 | 0.0 | 0.0 | 7.6 | 92.1 | 0.3 |
| 1A | M HF Ls | 8.5 | 14.2 | 27.0 | 23.5 | 35.3 | 0.0 |
| 1B | M HF Ls DMA | 1.6 | 12.8 | 23.5 | 15.3 | 47.6 | 0.8 |
| 1C | 2A distilled 2× | 2.0 | 0.0 | 4.2 | 16.3 | 79.4 | 0.1 |
| 3A | M HF Ls | 2.3 | 10.0 | 22.2 | 22.5 | 43.6 | 1.7 |
| 3B | M HF Ls DMA | 0.3 | 8.7 | 21.6 | 14.2 | 52.2 | 3.3 |
| 3C | 3A distilled 2× | 0.4 | 0.0 | 6.0 | 17.0 | 75.0 | 2.0 |
| 4A | M HF So[d] | 5.8 | 15.8 | 29.2 | 50.0 | 4.6 | 0.4 |
| 4B | M HF So DMA | 0.7 | 14.4 | 25.2 | 51.9 | 4.5 | 4.0 |
| 4C | 4A distilled 5× | 1.3 | 0.0 | 4.0 | 78.0 | 13.0 | 5.0 |
| 5A | M HF Sf | — | 11.6 | 18.1 | 66.5 | — | 3.8 |
| 5B | M HF Sf DMA | 2.3 | 7.0 | 12.7 | 77.1 | — | 3.2 |
| 5C | 5A distilled 2× | 2.6 | 0.5 | 9.3 | 85.1 | — | 5.1 |
| 6A | M HF Ls[e] | 8.7 | 14.3 | 27.8 | 23.1 | 34.5 | 0.3 |
| 6B | M HF Ls EA | 6.3 | 11.4 | 24.5 | 19.6 | 43.7 | 0.8 |
| 6C | 6A distilled 5× | 7.9 | 0.0 | 0.5 | 3.4 | 95.0 | 1.1 |
| 7A | M HF Ls | 2.5 | 7.0 | 21.8 | 19.8 | 51.0 | 0.4 |
| 7B | M HF Ls EA | 12.1 | 9.0 | 27.0 | 20.2 | 42.2 | 1.6 |
| 7C | 7A distilled 2× | 11.3 | 0.0 | 14.4 | 26.0 | 59.0 | 0.6 |

[a] M = methyl, HF = hydroformylated, LS = linseed esters, So = soybean esters, Sf = safflower esters, DMA = dimethyl acetals, and EA = ethylene glycol acetals.
[b] Methyl palmitate + methyl stearate.
[c] Hydroxyl value: 23.0.
[d] Hydroxyl value: 21.7.
[e] Hydroxyl value: 28.7.

EXAMPLES 2–5

Linseed oil methyl esters (Ls), soybean oil methyl esters (So), and safflower oil methyl esters (Sf) were hydroformylated in essentially the same manner as described in Example 1A. The resulting hydroformylated methyl esters were treated in the same manner as described in Example 1B in the proportions and under the conditions described in Table 2.

Each crude acetalated product, 2B, 3B, 4B, and 5B, was distilled in essentially the same manner as described in Example 1C under the conditions shown in Table 3.

separatory funnel and the residue, mostly unreacted glycol and insoluble catalyst, was washed several times with benzene, which was decanted into the separatory funnel. The benzene solution was washed first with bicarbonate solution and then with water. The work-up was essentially as described in Example 1B. A clear, amber liquid was obtained (614 g., Example 6B, Table 1). This crude ethylene acetal (553.5 g.) was subjected to five successive molecular distillations to produce a clear, colorless distillate (206°–219° C./30–35 millitorr; 110.8 g., Example 6C, Table 1) which analyzed 95% triacetal by GLC. Examples 6A, B, and C were analyzed as described in Example 1 (Table 1).

Table 2

| Example No. | Hydroformylated Methyl Esters | | MeOH, ml. | Trimethyl Orthoformate, ml. | Catalyst | | Time of Reaction, hours | Yield of Crude Product, g. |
|---|---|---|---|---|---|---|---|---|
| | Type | Weight, g. | | | % HCl in MeOH | ml. | | |
| 2B | Ls | 304 | 270 | 125 | 10 | 50 | 6 | 342 |
| 3B | Ls | 145 | 400 | 75 | 7 | 50 | 2 | 167 |
| 4b | So | 260 | 150 | 100 | 10 | 50 | 2.5 | 296 |
| 5B | Sf | 100 | 83 | 25 | CER[a] | (8.2 g.) | 30 | 10 |

[a] Cationic-exchange resin (Dowex 50WX-8, 20–50 mesh) washed with dilute (1 5) hydrochloric acid then with distilled water until effluent was neutral. The resin was then slurried in toluene which was removed by distillation.

Table 3

| Example No. | Distillation No. of Times | Distillation Temp., °C. | Distillation Pressure millitorr | Yield of Distilled Product, g. |
| --- | --- | --- | --- | --- |
| 2C | 5 | 110–145 | 25–45 | 49.7 |
| 3C | 2 | 117–140 | 28–39 | 66.9 |
| 4C | 5 | 135–140 | 30–40 | 78.4 |
| 5C | 2 | 120–125 | 22–30 | 56.3 |

EXAMPLE 7

Ethylene glycol (32 ml.), $KHSO_4$ (0.5 g., fused and pulverized), and hydroformylated linseed methyl esters (97.9 g. prepared as described in Example 1A, see Example 7A, Table 1) were heated at 90°–110°C. and at 103 mm. p.s.i.g. for 5.5 hours and worked up as described in Example 6 to yield 112.5 g. of crude ethylene acetals (Example 7B, Table 1). The acetal product was molecularly distilled two times at 150°–170°C. and at 30–35 millitorr pressure to produce 72.4 g. of the desired product (see Example 7C, Table 1). Examples 7A, B, and C were analyzed as described in Example 1 (Table 1).

EXAMPLE 8

A commercially available PVC in powdered form and having a molecular weight range of from 53,000 to 130,000 was blended in the following manner:

| Material | Parts by weight |
| --- | --- |
| PVC | 65 |
| Plasticizer | 32 |
| Bd-Cd Complex | 2 |
| Epoxidized oil | 1 |

Plasticizers used in the formulation included Examples 1C, 2C, 3C, 4C, 5C, 6C, 7C, 50/50 mixtures of each with DOP, 50/50 mixtures of DOP and DOS, a 50/50 mixture of DOP and a monoacetal derivative secondary plasticizer as described in Awl et al., supra (i.e., 95% mono), and a commercial plasticizer.

The plasticizer was added to a dry mixture of PVC and stabilizers before milling. Milling was carried out on a 4 × 8 in. rubber mill at a temperature of 320°F. (160°C.) for approximately 8 minutes. The sheeted resin was then molded in a standard 6 × 6 × 0.075 in. mold. The mold containing the resin was first heated to 320°F. (160°C.) for 10 minutes without pressure, then pressed at 1000 p.s.i. for an additional 10 minutes at 320°F. (160°C.). The mold was then cooled under pressure until it was at approximately room temperature.

All plasticized PVC products were tested by standard ASTM methods, except the heat stability and migration (cf. Table 4). To determine tensile strength, ultimate elongation, and 100% modulus, specimens were die-cut from the molded sheets parallel to the milling axis. Measurements were made on an Instron tester at a jaw separation rate of 20 in./minute. Specimens were equilibrated at 73°F. (22.8°C.) and 50% RH for at least 24 hours before testing. Torsional modulus as a function of temperature was determined with the Clash-Berg stiffness tester (ASTM D1043-51).

Table 4

| Plasticizer (Example No. From Table 1) | Torsional Stiffness, °C. $T_f$ | Torsional Stiffness, °C. $T_4$ | Compatibility, Δ ($T_4-T_f$) | Tensile Strength, p.s.i. | Elongation, % | 100% Modulus, p.s.i. | Migration Wt. Loss, % | Volatility Wt. Loss, % | Heat Stability (3), hours |
| --- | --- | --- | --- | --- | --- | --- | --- | --- | --- |
| DOP | −25 | 4 | 29 | 2835 | 290 | 1165 | 3.0 | 1.5 | 6.5 |
| DOS | −57 | −7 | 50 | 2355 | 295 | 1045 | 19.3 | 1.6 | — |
| Commercial Plasticizer | −21 | 8 | 29 | 2830 | 305 | 1345 | 3.9 | 0.9 | 7.5 |
| 1C | −21 | 8 | 29 | 2680 | 235 | 1245 | 2.7 | 1.3 | 4 |
| 2C | −17 | 10 | 27 | 2890 | 240 | 1455 | 1.9 | 0.8 | 4.5 |
| 3C | −21 | 8 | 29 | 2790 | 300 | 1215 | 2.8 | 1.2 | 4.5 |
| 4C | −30 | 4 | 34 | 2825 | 260 | 1295 | 6.6 | 3.2 | 4.5 |
| 5C | −33 | 6 | 39[a] | 2495 | 325 | 1190 | 8.2 | 6.6 | 4 |
| 6C | −12 | 15 | 27[b] | 2995 | 210 | 1795 | 1.0 | 1.8 | 4.5 |
| 7C | −18 | 10 | 28 | 3025 | 320 | 1450 | 2.4 | 0.9 | 4.5 |
| DOS/DOP 50/50 | −43 | −5 | 38 | 2790 | 290 | 1150 | 12.2 | 1.5 | 7.5 |
| 95% Mono/DOP 50/50 | −38 | 0 | 38 | 2655 | 350 | 1155 | 8.8 | 2.1 | — |
| 1C/DOP 50/50 | −25 | 4 | 29 | 2690 | 310 | 1170 | 3.0 | 1.5 | 4 |
| 2C/DOP 50/50 | −19 | 5 | 24 | 2755 | 275 | 1265 | 2.6 | 1.0 | 4.5 |
| 3C/DOP 50/50 | −25 | 4 | 29 | 2880 | 275 | 1255 | 2.7 | 1.3 | 4 |
| 4C/DOP 50/50 | −28 | 3 | 31 | 2590 | 210 | 1220 | 4.7 | 1.7 | 4.5 |
| 6C/DOP 50/50 | −18 | 8 | 26 | 2885 | 280 | 1450 | 1.9 | 0.9 | 4.5 |
| 7C/DOP 50/50 | −22 | 6 | 28 | 2830 | 300 | 1225 | 2.5 | 1.4 | 4.5 |

[a] Moderate exudate after 48 hours.
[b] Slight surface exudate after 2 weeks.

Migration of the plasticizers from the resin was measured according to the procedure of Geenty (India Rubber World 126: 646, 1952) by burying a weighed test specimen in adsorbent powder consisting of a hydrated silica (sold as silicic acid, analytical grade, 100 mesh), and following the loss in weight as a function of time at 23°C. The basis of this method is the removal of plasticizer as soon as it diffuses to the surface.

Volatility was determined at 70°C. by use of activated carbon (Columbia activated carbon 6 to 14 mesh) (ASTM D1203-55); the volatilized plasticizer was adsorbed by the activated carbon in a closed container.

Volatility and migration were studied on approximately 10-mil. sheets, which were milled only.

Heat stability tests were conducted on molded specimens in an air convection oven at 160°C. Samples were removed and periodically examined with a GE visible light spectrophotometer. A wavelength of 600 mμ was chosen to measure the development of color in the specimens. Samples were examined every 15 minutes for the first hour of exposure and then every 30 minutes thereafter until failure. The samples were considered to have failed when the transmission at 600 mμ was less than 20 percent.

For further discussion of the data and information disclosed herein, see Awl et al., J. Amer. Oil Chem.

Soc. 51: 224–228, 1974, which is incorporated herein by reference.

We claim:

1. A method of preparing plasticized poly(vinyl chloride) compositions comprising the following steps:
   a. reacting methyl diformylstearate, or methyl triformylstearate, or mixtures of the same with trimethyl orthoformate and methanol, or with ethylene glycol in the presence of a catalytic amount of an acid catalyst to form the corresponding dimethyl acetal or ethylene acetal derivatives of said methyl diformylstearate, or of said methyl triformylstearate, or of said mixtures; and
   b. fusing a plasticizing amount of the products of the reaction described in step (a) with poly(vinyl chloride).

2. A method of preparing plasticized poly(vinyl chloride) compositions as described in claim 1 wherein methyl diformylstearate, or methyl triformylstearate, or mixtures of the same are reacted with trimethyl orthoformate in methanol and in the presence of a catalytic amount of hydrochloric acid at the reflux temperature of the reaction media for a time sufficient to form the corresponding dimethyl acetal derivatives of said methyl diformylstearate, or said methyl triformylstearate, or said mixtures.

3. A method of preparing plasticized poly(vinyl chloride) as described in claim 1 wherein methyl diformylstearate, or methyl triformylstearate, or mixtures of the same are reacted with ethylene glycol in benzene and in the presence of a catalytic amount of potassium bisulfate at the reflux temperature of the reaction media for a time sufficient to form the corresponding ethylene acetal derivatives of said methyl diformylstearate, or said methyl triformylstearate, or said mixtures.

4. In a plasticized poly(vinyl chloride) composition an improvement comprising a plasticizing amount of a primary plasticizer selected from the group consisting of methyl di(dimethyl acetal) stearate, methyl tri(dimethyl acetal) stearate, and mixtures of the same.

5. A plasticized poly(vinyl chloride) composition as described in claim 4 wherein the primary plasticizer is present in an amount equaling from 5 to 35 percent of the total weight of the composition.

6. A plasticized poly(vinyl chloride) composition as described in claim 4 wherein methyl di(dimethyl acetal) stearate has the following structure:

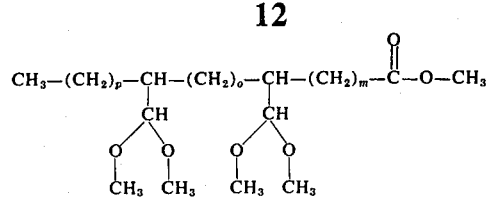

where $m + o + p = 14$ and $o = 1$ or $2$.

7. A plasticized poly(vinyl chloride) composition as described in claim 4 wherein methyl tri(dimethyl acetal) stearate has the following structure:

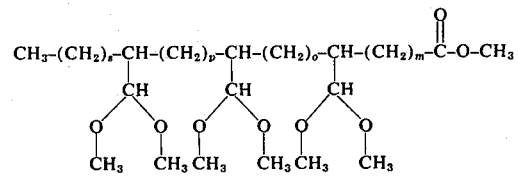

where $m + o + p + s = 13$, $o = 1$ or $2$, and $p = 1$ or $2$.

8. In a plasticized poly(vinyl chloride) composition an improvement comprising a plasticizing amount of a primary plasticizer selected from the group consisting of methyl di(ethylene acetal) stearate, methyl tri(ethylene acetal) stearate, and mixtures of the same.

9. A plasticized poly(vinyl chloride) composition as described in claim 4 wherein methyl di(ethylene acetal) stearate has the following structure:

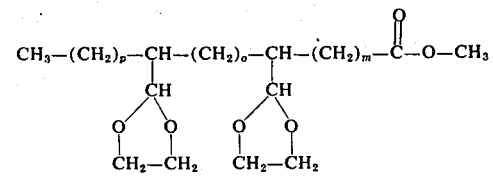

where $m + o + p = 14$ and $o = 1$ or $2$.

10. A plasticized poly(vinyl chloride) composition as described in claim 4 wherein methyl tri(ethylene acetal) stearate has the following structure:

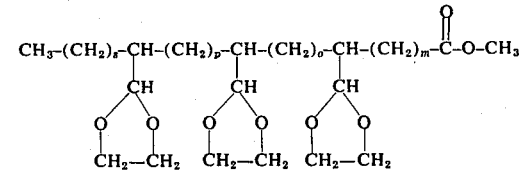

where $m + o + p + s = 13$, $o = 1$ or $2$, and $p = 1$ or $2$.

* * * * *

UNITED STATES PATENT OFFICE
CERTIFICATE OF CORRECTION

Patent No. 3,983,067                                 Dated September 28, 1976

Inventor(s) Richard A. Awl and Everett H. Pryde

It is certified that error appears in the above-identified patent and that said Letters Patent are hereby corrected as shown below:

Column 1, line 25, cancel "phorphoric" and insert -- phosphoric -- ;
Column 1, line 36, cancel "glyclols" and insert -- glycols -- .
Column 3, line 43, cancel "Th" and insert -- The -- ;
Column 3, line 48, cancel "an" and insert -- and -- .
Column 4, line 17, cancel "Th" and insert -- The -- .
Column 5, line 54, cancel "plasticier" and insert -- plasticizer -- .
Column 6, line 8, cancel "linoleate" (second occurrence) and insert
    --linolenate -- ;

Column 7, line 1, cancel "J".

In Table 2, line 4 under "Yield of Crude Product, g." cancel "10"
    and insert -- 107 -- ;
In Table 2, footnote a, cancel "(1 5)" and insert -- (1:5) -- .
Column 9, line 17, cancel "p.s.i.g."

Signed and Sealed this

Twelfth Day of April 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,983,067          Dated September 28, 1976

Inventor(s) Richard A. Awl et al.

It is certified that error appears in the above-identified patent and that said Letters Patent are hereby corrected as shown below:

Table 1, in column heading "Description$^8$" cancel "8" and insert -- a --.

Signed and Sealed this

Twenty-fourth Day of May 1977

[SEAL]

Attest:

RUTH C. MASON
*Attesting Officer*

C. MARSHALL DANN
*Commissioner of Patents and Trademarks*